United States Patent
Kim et al.

(10) Patent No.: US 8,873,590 B2
(45) Date of Patent: Oct. 28, 2014

(54) APPARATUS AND METHOD FOR CORRECTING JITTER

(75) Inventors: Sung-kee Kim, Hwaseong-si (KR);
Tae-sung Park, Yongin-si (KR);
Gil-yoon Kim, Suwon-si (KR);
Dae-hyung Kwon, Seoul (KR);
Do-young Joung, Seoul (KR);
Chun-bae Park, Suwon-si (KR); Ji-wan Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 12/882,350

(22) Filed: Sep. 15, 2010

(65) Prior Publication Data

US 2011/0187926 A1 Aug. 4, 2011

(30) Foreign Application Priority Data

Feb. 4, 2010 (KR) ........................ 10-2010-0010473

(51) Int. Cl.
*H04J 3/06* (2006.01)
*H04N 7/00* (2011.01)

(52) U.S. Cl.
CPC ...................................... *H04N 7/00* (2013.01)
USPC ............................ 370/516; 370/252; 348/497

(58) Field of Classification Search
USPC ................. 370/252, 503, 509, 510, 519, 516; 709/231; 348/497; 375/371
See application file for complete search history.

(56) References Cited

U.S. PATENT DOCUMENTS

| | | | | |
|---|---|---|---|---|
| 6,452,950 | B1 * | 9/2002 | Ohlsson et al. | 370/516 |
| 7,085,268 | B2 * | 8/2006 | Fukuda et al. | 370/389 |
| 7,248,590 | B1 * | 7/2007 | Liu | 370/395.64 |
| 7,474,624 | B2 * | 1/2009 | Grossman | 370/252 |
| 7,545,794 | B2 * | 6/2009 | Loukianov | 370/350 |
| 8,023,533 | B2 * | 9/2011 | Kure | 370/503 |
| 8,255,559 | B2 * | 8/2012 | Labonte et al. | 709/231 |
| 8,358,589 | B2 * | 1/2013 | Apostol et al. | 370/252 |
| 2002/0136164 | A1 * | 9/2002 | Fukuda et al. | 370/230 |
| 2004/0170199 | A1 * | 9/2004 | Golan et al. | 370/516 |
| 2004/0252701 | A1 * | 12/2004 | Anandakumar et al. | 370/395.21 |
| 2005/0132412 | A1 * | 6/2005 | Richardson et al. | 725/100 |
| 2005/0177643 | A1 * | 8/2005 | Xu | 709/231 |
| 2005/0201399 | A1 * | 9/2005 | Woodward et al. | 370/412 |
| 2005/0259690 | A1 * | 11/2005 | Garudadri et al. | 370/477 |
| 2007/0086481 | A1 * | 4/2007 | Klemets | 370/466 |
| 2007/0250761 | A1 * | 10/2007 | Bradley et al. | 715/500.1 |
| 2008/0117901 | A1 * | 5/2008 | Klammer | 370/389 |
| 2008/0120424 | A1 * | 5/2008 | Deshpande | 709/230 |

(Continued)

OTHER PUBLICATIONS

Singer et al, RFC 5450, Transmission Time Offsets in RTP Streams, Mar. 2009. pp. 1-8.*

(Continued)

*Primary Examiner* — Ahmed Elallam
(74) *Attorney, Agent, or Firm* — Sughrue Mion, PLLC (57) ABSTRACT

A jitter correction method of a transmitting device, a jitter correction method of a receiving device, a transmitting device, and a receiving device are provided. The jitter correction method of the transmitting device includes: determining a time stamp of a video frame; determining a transfer time of an real-time transport protocol (RTP) packet that includes at least a part of the video frame as a payload; generating the RTP packet including the time stamp and the transfer time; and transmitting the RTP packet to a receiving device.

33 Claims, 4 Drawing Sheets

(56) References Cited

U.S. PATENT DOCUMENTS

| | | | |
|---|---|---|---|
| 2008/0159240 A1* | 7/2008 | Hamilton | 370/338 |
| 2009/0285217 A1* | 11/2009 | Frink et al. | 370/394 |
| 2010/0027567 A1* | 2/2010 | Teramoto | 370/516 |
| 2010/0067430 A1* | 3/2010 | Shinozaki | 370/315 |
| 2010/0322084 A1* | 12/2010 | Mahkonen | 370/248 |

OTHER PUBLICATIONS

Schulzrinne et al, RFC 3550, RTP: A Transport Protocol for Real-Time Applications, uly 2003. pp. 1-104.*

* cited by examiner

APPARATUS AND METHOD FOR CORRECTING JITTER

CROSS-REFERENCE TO RELATED PATENT APPLICATION

This application claims priority from Korean Patent Application No. 10-2010-0010473, filed on Feb. 4, 2010 in the Korean Intellectual Property Office, the disclosure of which is incorporated herein in its entirety by reference.

BACKGROUND

1. Field

Apparatuses and methods consistent with exemplary embodiments relate to correcting jitter, and more particularly, to a jitter correction method and a jitter correcting apparatus that can accurately calculate jitter information generated in an actual network by removing inaccuracies from the jitter information, which is a type of quality of service (QoS) information obtained through real-time transport protocol (RTP) control protocol (RTCP) and is generated during transmission of a video stream.

2. Description of the Related Art

Real-time transport protocol (RTP) is a protocol that is used for real-time transmission of multimedia data. RTP control protocol (RTCP) is a protocol used together with the RTP. The RTCP is used to correct a sampling time stamp between multimedia streams such as audio streams and video streams, and to transmit control information such as quality of service (QoS) information of a network, for example, information about a delay of a network, a loss rate of a packet, or jitter.

To use a high-speed real-time multimedia service using a wireless terminal while moving or while immobile, research into effective transmission of large-capacity video information is being conducted.

In particular, when a video signal is transmitted in a wireless channel environment in which throughput according to multipath fading and time is extremely variable, quality of a receiving screen is decreased due to picture quality deterioration, loss of a frame, delays, etc. Accordingly, in order to transmit high-quality video between terminals in a real-time multimedia service, there is a need to develop a technology for analyzing a wireless channel environment and transmitting a high-quality video that is optimized for a network situation. In particular, the QoS information obtained through the RTCP is one of the parameters that are widely used to analyze a network situation.

SUMMARY

Exemplary embodiments provide a jitter correction method and a jitter correcting apparatus that can accurately calculate jitter information, which is one type of Quality of Service (QoS) information obtained through a real-time transport protocol (RTCP) and is generated in an actual network.

Exemplary embodiments also provide a computer-readable recording medium having embodied thereon a program for executing the jitter correction method.

According to an aspect of an exemplary embodiment, there is provided a jitter correction method of a transmitting device, the method including: determining a time stamp of a video frame; determining a transfer time of a real-time transport protocol (RTP) packet that includes at least a part of the video frame as a payload; generating the RTP packet including the time stamp and the transfer time; and transmitting the generated RTP packet to a receiving device.

The time stamp may be a capture time of the video frame.

The at least a part of the video frame may be determined according to a size of a maximum transmission unit (MTU) of a communication media.

The RTP packet may include a default header and an extension header.

The default header may include the time stamp, and the extension header may include the transfer time.

The default header may include the transfer time, and the extension header may include the time stamp.

According to an aspect of another exemplary embodiment, there is provided a jitter correction method of a receiving device, the method including: receiving an RTP packet that includes a header and a payload of at least a part of a video frame, the header including a time stamp and a transfer time of the video frame, from a transmitting device; determining a receiving time of the RTP packet; and calculating jitter using the transfer time and the receiving time.

The header of the RTP packet may include a default header and an extension header.

The default header may include the time stamp, and the extension header comprises the transfer time.

The default header may include the transfer time, and the extension header comprises the time stamp.

The jitter correction method may further include: restoring the transfer time of the default header to the time stamp of the extension header; and reproducing the video stream by using the restored time stamp.

According to an aspect of another exemplary embodiment, there is provided a computer readable recording medium having embodied thereon a computer program for executing the method.

According to an aspect of another exemplary embodiment, there is provided a transmitting device including: a time stamp determining unit which determines a time stamp of a video frame; a transfer time determining unit which determines a transfer time of an RTP packet including at least a part of the video frame as a payload; a packet generating unit which generates the RTP packet including the time stamp and the transfer time; and a transmitting unit which transmits the RTP packet to a receiving device.

According to an aspect of another exemplary embodiment, there is provided a receiving device including: a receiving unit which receives an RTP packet including a header and a payload of at least a part of a video frame, the header including a time stamp and a transfer time of the video frame, from a transmitting device; a receiving time determining unit which determines a receiving time of the RTP packet; and a jitter calculating unit which calculates jitter using the transfer time and the receiving time.

According to an aspect of another exemplary embodiment, there is provided a jitter correction method of a transmitting device, the method including: determining a transfer time of a real-time transport protocol (RTP) packet that comprises a time stamp and at least a part of a video frame as a payload; adding the transfer time to the RTP packet; and transmitting the generated RTP packet to a receiving device.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Hereinafter, exemplary embodiments will be described in detail with reference to the attached drawings. The same reference numerals in the drawings denote the same element. In the drawings, the thicknesses of layers and regions are exaggerated for clarity.

Figure 1:
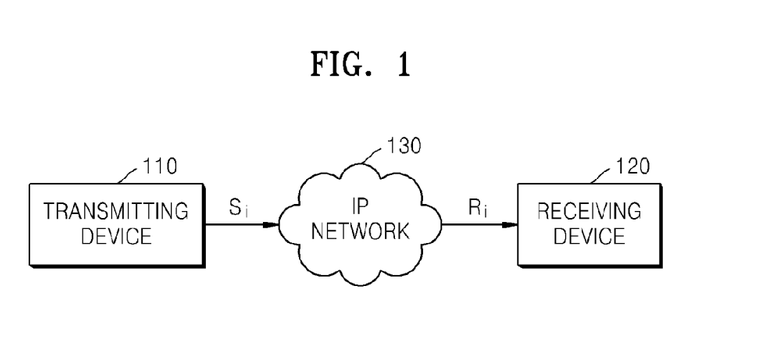
FIG. 1 is a block diagram illustrating an Internet protocol (IP) network including a transmitting device and a receiving device, according to an exemplary embodiment.

FIG. 1 is a block diagram illustrating an Internet protocol (IP) network 130 including a transmitting device 110 and a receiving device 120, according to an exemplary embodiment.

The transmitting device 110, e.g., a server, transmits a video stream to the receiving device 120, e.g., a client, and the receiving device 120 reproduces the received video stream.

A jitter calculating method using real-time transport protocol (RTP) control protocol (RTCP), performed by the receiving device 120 is defined in Internet engineering task force (IETF) request for comments (RFC) 3550, which is a real-time transport protocol (RTCP) control protocol (RTP)/RTCP standard and is incorporated herein in its entirety by reference, as follows:

Si: a time stamp of an i-th RTP packet transmitted from the transmitting device 110;

Ri: time when the receiving device 120 received the i-th RTP packet. The unit of time is the same as the time stamp of the RTP packet.

Furthermore, a value D may be defined with respect to two packets i and j, as follows. That is, D may be a difference of time between when the two RTP packets i and j are transmitted from a network:

$$D(i,j)=(Rj-Ri)-(Sj-Si)=(Rj-Sj)-(Ri-Si)$$

When the receiving device 120 receives the i-th RTP packet, jitter may be calculated as follows. That is, the jitter may be defined to be a mean deviation of a difference D in packet spacing at a sender and a receiver for a pair of packets, and may be calculated for each packet:

$$J(i)=J(i-1)+(|D(i-1, i)|-J(i-1))/16$$

Figure 2:
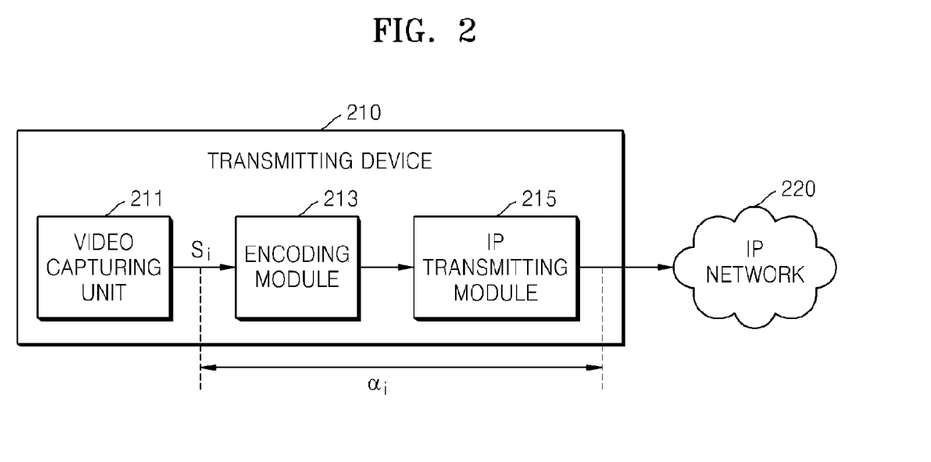
FIG. 2 is a block diagram illustrating an example in which a jitter error is generated, according to an exemplary embodiment.

FIG. 2 is a block diagram illustrating an example in which a jitter error is generated, according to an exemplary embodiment. When video data that is encoded according to a standard such as MPEG-4, H.263, H.264, etc., is transmitted using RTP, a time stamp S included in an RTP packet represents a sampling time of a first octet of the RTP packet.

The sampling time may be a presentation time when a video capturing unit 211 captures a video stream. For example, as illustrated in FIG. 2, the time stamp S included in the RTP packet is determined when capturing a video stream. The RTP packet including the time stamp S is transmitted to an IP network 220 via a video encoding module 213 and an IP transmitting module 215.

As such, a time when an i-th RTP packet is substantially transmitted from the transmitting device 210 to the IP network 220 may be represented as follows:

Time when the i-th RTP packet is substantially transmitted=$Si+\alpha i$.

Here, $\alpha$, which is a random value, is the time taken by the video encoding module 213 and the IP transmitting module 215 to process the video stream. For example, the time taken to encode a video stream in the encoding module 213 may be influenced by a complexity of an image or by whether an image is an intra (I) frame, a predictive (P) frame, or a bidirectionally predictive (B) frame. Also, the time taken to encode a video stream in the encoding module 213 may be influenced by other tasks (or threads) inside a terminal.

Aside from a case where a video stream is captured and encoded at approximately the same time, even when a file stored in a storage device such as a memory and a disk is transmitted to the IP network 220, the time taken to substantially transmit the i-th RTP packet to the IP network 220 may be influenced by the time taken to access a storage medium and other tasks inside a terminal.

Accordingly, when calculating jitter, the calculated jitter may have an error when the jitter is originally affected by transmission characteristics of the IP network 220, but a time stamp that is included in the transmitted RTP packet and represents a capturing time is used.

Figure 3:
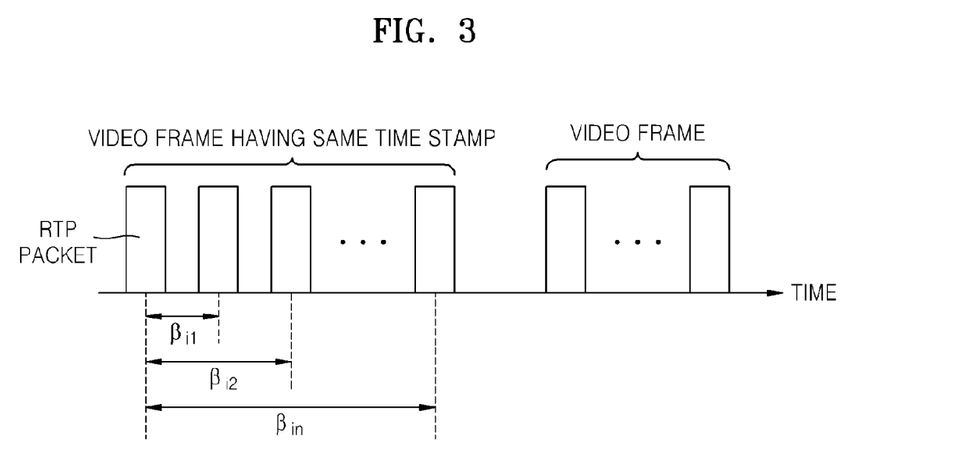
FIG. 3 is a block diagram illustrating another example in which a jitter error is generated, according to an exemplary embodiment.

FIG. 3 is a block diagram illustrating another example in which a jitter error is generated, according to an exemplary embodiment. Time when an i-th RTP packet is substantially transmitted to the IP network 220 may be influenced by a condition whereby a video stream is segmented into plural IP packets. When the video stream is transmitted using a wireless channel, the amount of data that may be transmitted in one IP packet is limited. A wire communication media may transmit an IP packet having a maximum transmission unit (MTU) of about 1500 bytes without segmentation, while a wireless communication media may generally transmit an IP packet having a MTU of 254 bytes or less.

Accordingly, when one frame has a large amount of data, like a video stream, the frame may be divided into a plurality of RTP packets and transmitted. In this case, each of the divided RTP packets includes the same time stamp value. That is, since the RTP packets are physically different from each other, a time when each of the RTP packets is substantially transmitted to the IP network is different, but the RTP packets have the same time stamp value.

In detail, when one video frame is divided into M number RTP packets and transmitted, a time when each of the RTP packet is substantially transmitted to the IP network may be defined as follows:

Time when an i-th RTP packet is substantially transmitted=$Si+\beta i1$

Time when an (i+1)th RTP packet is substantially transmitted=$Si+\beta i2$

Time when an (i+2)th RTP packet is substantially transmitted=$Si+\beta i3$

. . .

Time when an $(i+M)$th RTP packet is substantially transmitted $=Si+\beta i(M-1)$.

Here, βi denotes a difference in transmission time between a first transmitted RTP packet and a currently transmitted RTP packet, from among packets including the same RTP time stamp (=Si).

β directly affects a jitter calculated using the RTP time stamp, and errors may result when calculating jitter generated due to transmission on a network.

Figure 4:
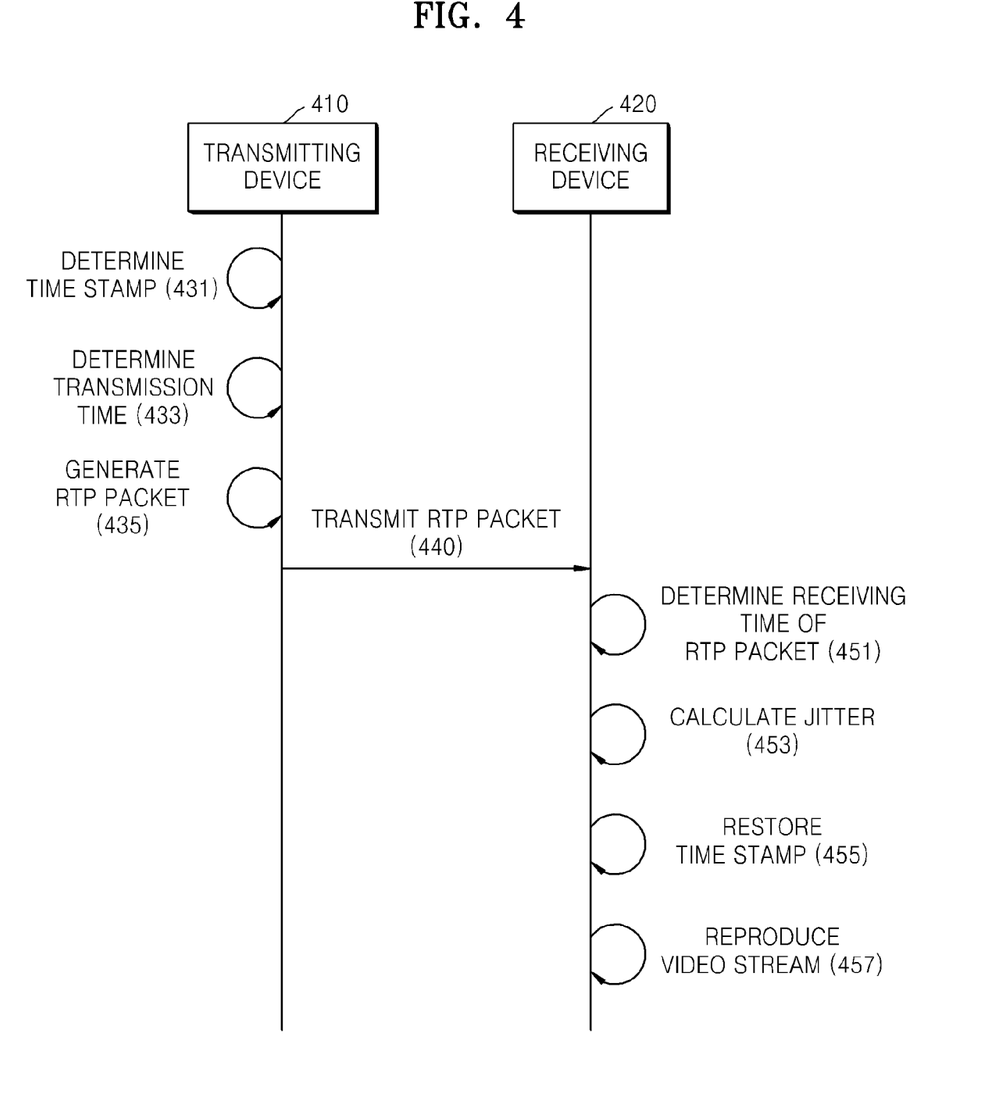
FIG. 4 illustrates a jitter correction method, according to an exemplary embodiment.

FIG. 4 illustrates a jitter correction method, according to an exemplary embodiment. Referring to FIG. 4, in operation 431, a transmitting device 410 determines a time stamp of a video frame. The time stamp may be a capture time of the video frame. The video frame may be divided on the basis of the size of a MTU of a communication medium used by the transmitting device 410, and is packetized into a payload of an RTP packet.

In operation 433, the transmitting device 410 determines a transfer time of an RTP packet. The transfer time is determined using a clock that may be the same as that used when determining the time stamp.

In operation 435, the transmitting device 410 generates an RTP packet including the time stamp and the transfer time. The RTP packet may include a default header and may include an extension header. The transmitting device 410 may packetize the transfer time using the default header and may packetize the time stamp using the extension header. The structure of the RTP packet will be described in detail with reference to FIG. 5. In the current exemplary embodiment, the default header of the RTP packet is used to transmit the transfer time to a receiving device 420, but one of ordinary skill in the art would understand that various other information transmitting methods are possible according to one or more other exemplary embodiments.

In operation 440, the transmitting device 410 transmits the RTP packet to the receiving device 420.

In operation 451, the receiving device 420 having received the RTP packet determines a receiving time of the RTP packet.

In operation 453, the receiving device 420 calculates jitter using the transfer time included in the default header and the determined receiving time. That is, the receiving device 420 uses an actual transfer time instead of a time stamp of a video frame, when calculating jitter. A jitter calculating method may be performed according to RFC 3550, and thus a detailed description thereof will be omitted herein.

In operation 455, the receiving device 420 restores the transfer time included in the default header to the time stamp included in the extension header, so as not to affect a module located inside or on a higher level of the RTP module.

In operation 457, the receiving device 420 reproduces the video stream by using the restored time stamp.

According to the current exemplary embodiment, while transmitting a video using RTP, when calculating jitter generated in a network, factors unrelated to the network are removed, and factors generated due to transmission on the network are considered. Thus, the jitter can be accurately calculated. Therefore, according to the current exemplary embodiment, an adaptive real-time transmission service of multimedia data using jitter information is provided.

Meanwhile, according to another exemplary embodiment, the transmitting device 410 may packetize a time stamp by using a default header and may packetize a transfer time by using an extension header. An exemplary structure of an RTP packet will be described in detail with reference to FIG. 6.

Figure 6:
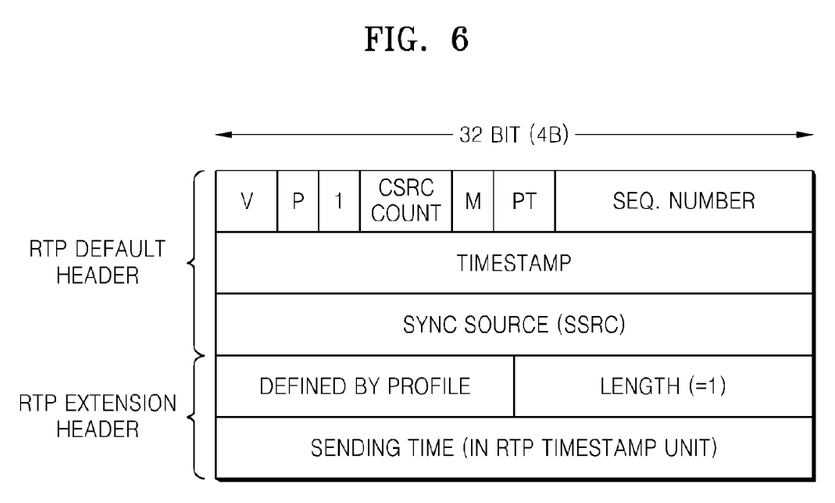
FIG. 6 illustrates an RTP packet including jitter correction information, according to another exemplary embodiment.

In this case, the receiving device 420 having received the RTP packet determines a receiving time of the RTP packet. The receiving device 420 calculates jitter using the transfer time included in the extension header and the determined receiving time. That is, the receiving device 420 uses an actual transfer time instead of a time stamp of a video frame when calculating the jitter. In the current exemplary embodiment, the extension header of the RTP packet is used to transmit the time stamp to the receiving device 420, but one of ordinary skill in the art would understand that various other information transmitting methods are possible according to one or more other exemplary embodiments.

The receiving device 420 reproduces the video stream by using the time stamp included in the default header.

Figure 5:
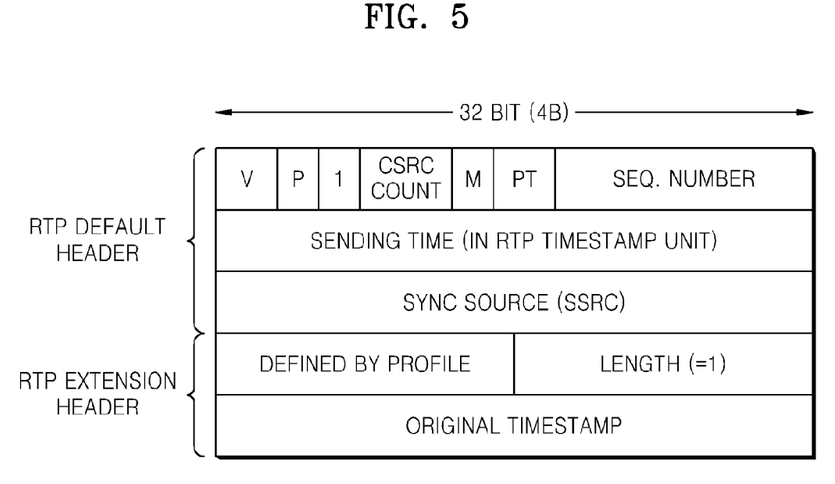
FIG. 5 illustrates a real-time transport protocol (RTP) packet including jitter correction information, according to an exemplary embodiment.

FIG. 5 illustrates an RTP packet including jitter correction information, according to an exemplary embodiment. Referring to FIG. 5, the RTP packet may include a default header and may optionally include an extension header. When an extension (E) field included in the default header is set to 1, the extension header capable of transmitting additional information may be used in addition to the default header.

The transmitting device 410 may packetize a transfer time by using the default header and may packetize a time stamp by using the extension header.

As illustrated in FIG. 5, the extension header starts with a standard RTP extension header field of 4 bytes. The standard RTP extension header field includes a "Defined by profile" field and a "Length" field. The "Defined by profile" field represents an identifier of an extended service, and the "Length" field represents a length of information to be packetized into the extension header.

Other fields that may be included in the default header of the RTP packet are described in IETF RFC 3550, and thus a detailed description thereof will be omitted herein.

FIG. 6 illustrates an RTP packet including jitter correction information, according to another exemplary embodiment.

The RTP packet may include a default header and may optionally include an extension header. When the extension (E) field included in the default header is set to 1, an extension header capable of transmitting additional information may be used in addition to the default header.

The transmitting device 410 may packetize a time stamp by using the default header and may packetize a transfer time by using the extension header.

As illustrated in FIG. 6, the extension header starts with a standard RTP extension header field of 4 bytes. The standard RTP extension header field includes a "Defined by profile" field and a "Length" field. The "Defined by profile" field represents an identifier of an extended service, and the "Length" field represents a length of information to be packetized into the extension header.

Other fields that may be included in the default header of the RTP packet are described in IETF RFC 3550, and thus a detailed description thereof will be omitted herein.

Figure 7:
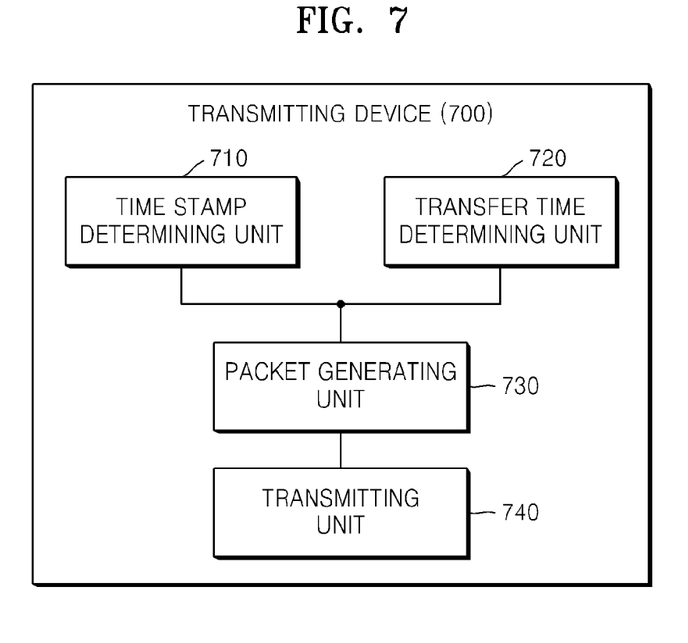
FIG. 7 is a schematic block diagram illustrating a transmitting device, according to an exemplary embodiment.

FIG. 7 is a schematic block diagram illustrating a transmitting device 700, according to an exemplary embodiment. Referring to FIG. 7, the transmitting device 700 includes a time stamp determining unit 710, a transfer time determining unit 720, a packet generating unit 730, and a transmitting unit 740.

The time stamp determining unit 710 determines a time stamp of a video frame. For example, the time stamp may be a capture time of the video frame. The video frame is divided on the basis of the size of a MTU of a communication medium used by the transmitting device 410, and is packetized into a payload of an RTP packet.

The transfer time determining unit 720 determines a transfer time of the RTP packet including at least a part of the video frame as a payload. The transfer time is determined using a clock that may be, for example, the same as that used when determining the time stamp.

The packet generating unit 730 generates the RTP packet including the time stamp and the transfer time. The RTP packet may include a default header and may optionally include an extension header. The packet generating unit 730 may packetize the transfer time by using the default header and may packetize the time stamp by using the extension header.

The transmitting unit 740 transmits the RTP packet to a receiving device 800.

Meanwhile, according to another exemplary embodiment, the packet generating unit 730 generates the RTP packet including the time stamp and the transfer time. The RTP packet may include the default header and may optionally include the extension header. The packet generating unit 730 may packetize the time stamp by using the default header and may packetize the transfer time by using the extension header.

Figure 8:
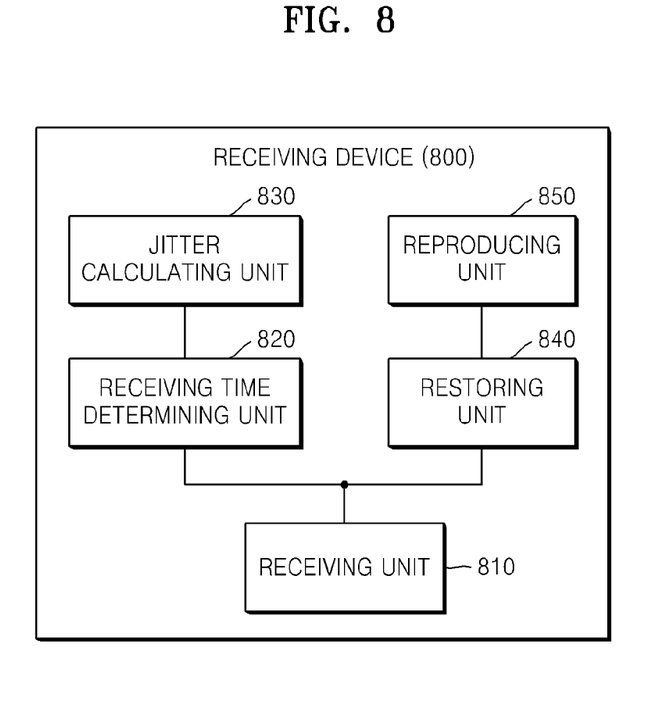
FIG. 8 is a schematic block diagram illustrating a receiving device, according to an exemplary embodiment.

FIG. 8 is a schematic block diagram illustrating a receiving device 800, according to an exemplary embodiment. Referring to FIG. 8, the receiving device 800 includes a receiving unit 810, a receiving time determining unit 820, a jitter calculating unit 830, a restoring unit 840, and a reproducing unit 850.

The receiving unit 810 receives an RTP packet, which includes a header and a payload including at least a part of a video frame, from a transmitting device. The RTP packet may include a default header and an extension header. For example, a transfer time is included in the default header, and a time stamp is included in the extension header.

The receiving time determining unit 820 determines a receiving time of the RTP packet.

The jitter calculating unit 830 calculates jitter using the transfer time included in the default header and the determined receiving time. That is, the jitter calculating unit 830 uses an actual transfer time instead of the time stamp of the video frame, when calculating the jitter. A jitter calculating method may be performed according to RFC 3550, and thus a detailed description thereof will be omitted herein.

The restoring unit 840 restores the transfer time included in the default header to the time stamp included in the extension header, so as not to affect a module located inside or on a higher level of the RTP module.

The reproducing unit 850 reproduces a video stream using the restored time stamp.

Meanwhile, according to another exemplary embodiment, a receiving device 800 includes a receiving unit, a receiving time determining unit, a jitter calculating unit, and a reproducing unit.

The receiving unit receives an RTP packet, which includes a header and a payload including at least a part of a video frame, from a transmitting device. The RTP packet includes a default header and an extension header. For example, a time stamp is included in the default header, and a transfer time is included in the extension header.

The receiving time determining unit determines a receiving time of the RTP packet.

The jitter calculating unit calculates jitter using the transfer time included in the extension header and the determined receiving time. That is, the receiving device uses an actual transfer time instead of the time stamp of the video frame when calculating the jitter.

The reproducing unit reproduces the video stream using the time stamp inside the default header.

For example, the transmitting device 700 and the receiving device 800 according to an exemplary embodiment may include a bus coupled to units of each device illustrated in FIGS. 7 and 8, at least one processor coupled to the bus, and a memory that is coupled to the bus in order to store a received message and a generated message and also is coupled to at least one processor for executing the commands described above.

While not restricted thereto, a system according one or more exemplary embodiments can be also embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and etc. The computer readable recording medium can also be distributed over network coupled computer systems so that the computer readable code is stored and executed in a distributed fashion.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A jitter correction method of a transmitting device, the method comprising:
    determining a time stamp of a video frame;
    determining a transfer time of a real-time transport protocol (RTP) packet, wherein the RTP packet comprises at least a part of the video frame as a payload;
    generating the RTP packet comprising the time stamp and the transfer time; and
    transmitting the generated RTP packet to a receiving device,
    wherein the transfer time is a clock value at a transmission time of the RTP packet applied to calculating jitter instead of the time stamp.

2. The jitter correction method of claim 1, wherein the time stamp is a capture time of the video frame.

3. The jitter correction method of claim 1, wherein the at least a part of the video frame is determined according to a size of a maximum transmission unit (MTU) of a communication media used to transmit the generated RTP packet to the receiving device.

4. The jitter correction method of claim 1, wherein the RTP packet comprises a default header and an extension header.

5. The jitter correction method of claim 4, wherein the default header comprises the time stamp, and the extension header comprises the transfer time.

6. The jitter correction method of claim 4, wherein the default header comprises the transfer time, and the extension header comprises the time stamp.

7. The jitter correction method of claim 1, wherein the determining the transfer time comprises determining the transfer time using a clock that is used in the determining the time stamp.

8. The jitter correction method of claim 1, further comprising calculating a difference in transmission time between a first transmitted RTP packet and a currently transmitted RTP packet, from among packets of the video frame and using the difference in calculating the jitter.

9. The method of claim 1, wherein the determined transfer time of the RTP packet comprises measured actual time point using a clock, which is time after a payload of the RTP packet has been generated, wherein the receiving device provides a receiving time, which is an actual time point measured using a clock at a time when the RTP packet is received by the receiving device prior to processing the received RTP packet, and wherein actual transmission time of the RTP packet is determined using the transfer time and the receiving time and the jitter is calculated based on the actual transmission time of the RTP packet.

10. The method of claim 1, wherein the transfer time comprises an additional time stamp generated after encoding the video frame included in the payload of the RTP packet.

11. The method of claim 1, wherein the same clock is used to determine the time stamp and to determine the transfer time, which is an actual point in time after a payload of the RTP packet is generated and before the header of the RTP packet is generated for the transmission.

12. The method of claim 1, where the transfer time is a time point after the video frame is packetized into a payload of at least one RTP packet.

13. A jitter correction method of a receiving device, the method comprising:
  receiving, from a transmitting device, a real-time transport protocol (RTP) packet comprising a header and at least a part of a video frame as a payload, the header comprising a time stamp and a value which indicates transfer time of the video frame, wherein the transfer time is a clock value at a transmission time of the RTP packet;
  determining a receiving time of the RTP packet; and
  calculating jitter using the transfer time instead of the time stamp and the receiving time.

14. The jitter correction method of claim 13, wherein the header of the RTP packet comprises a default header and an extension header.

15. The jitter correction method of claim 14, wherein the default header comprises the time stamp, and the extension header comprises the transfer time.

16. The jitter correction method of claim 15, further comprising:
  restoring the transfer time of the extension header to the time stamp of the default header; and
  reproducing a video stream by using the restored time stamp.

17. The jitter correction method of claim 14, wherein the default header comprises the transfer time, and the extension header comprises the time stamp.

18. The jitter correction method of claim 17, further comprising:
  restoring the transfer time of the default header to the time stamp of the extension header; and
  reproducing a video stream by using the restored time stamp.

19. A transmitting device comprising:
  a time stamp determining unit which determines a time stamp of a video frame;
  a transfer time determining unit which determines a transfer time of a real-time transport protocol (RTP) packet comprising at least a part of the video frame as a payload;
  a packet generating unit which generates the RTP packet comprising the time stamp and the transfer time; and
  a transmitting unit which transmits the RTP packet to a receiving device,
  wherein the transfer time is a clock value at a transmission time of the RTP packet applied to calculating jitter instead of the time stamp.

20. The transmitting device of claim 19, wherein the time stamp is a capture time of the video frame.

21. The transmitting device of claim 19, wherein the at least a part of the video frame is determined according to a size of a maximum transmission unit (MTU) of a communication media used to transmit the generated RTP packet to the receiving device.

22. The transmitting device of claim 19, wherein the RTP packet comprises a default header and an extension header.

23. The transmitting device of claim 22, wherein the default header comprises the time stamp, and the extension header comprises the transfer time.

24. The transmitting device of claim 22, wherein the default header comprises the transfer time, and the extension header comprises the time stamp.

25. A receiving device comprising:
  a receiving unit which receives, from a transmitting device, a real-time transport protocol (RTP) packet comprising a header and at least a part of a video frame as a payload, the header comprising a time stamp and a value indicating transfer time of the video frame, wherein the transfer time is a clock value at a transmission time of the RTP packet;
  a receiving time determining unit which determines a receiving time of the RTP packet; and
  a jitter calculating unit which calculates jitter using the receiving time and the transfer time instead of the time stamp.

26. The receiving device of claim 25, wherein the header of the RTP packet comprises a default header and an extension header.

27. The receiving device of claim 26, wherein the default header comprises the time stamp, and the extension header comprises the transfer time.

28. The receiving device of claim 26, wherein the default header comprises the transfer time, and the extension header comprises the time stamp.

29. The receiving device of claim 28, further comprising:
  a restoring unit which restores the transfer time of the default header to the time stamp of the extension header; and
  a reproducing unit which reproduces a video stream by using the restored time stamp.

30. A jitter correction method of a transmitting device, the method comprising:
  determining a transfer time of a real-time transport protocol (RTP) packet, wherein the RTP packet comprises a time stamp and at least a part of a video frame as a payload and wherein the transfer time is a clock value at a transmission time of the RTP packet;
  adding the transfer time to the RTP packet; and
  transmitting the generated RTP packet to a receiving device,
  wherein the jitter correction is performed based on the added transfer time instead of the time stamp.

31. A non-transitory computer readable recording medium having embodied thereon a computer program for executing the method of claim 1.

32. A non-transitory computer readable recording medium having embodied thereon a computer program for executing the method of claim 13.

33. A non-transitory computer readable recording medium having embodied thereon a computer program for executing the method of claim 30.

* * * * *